March 12, 1940.  D. ULREY  2,193,606
PHOTOSENSITIVE APPARATUS
Filed Aug. 21, 1937   3 Sheets-Sheet 1
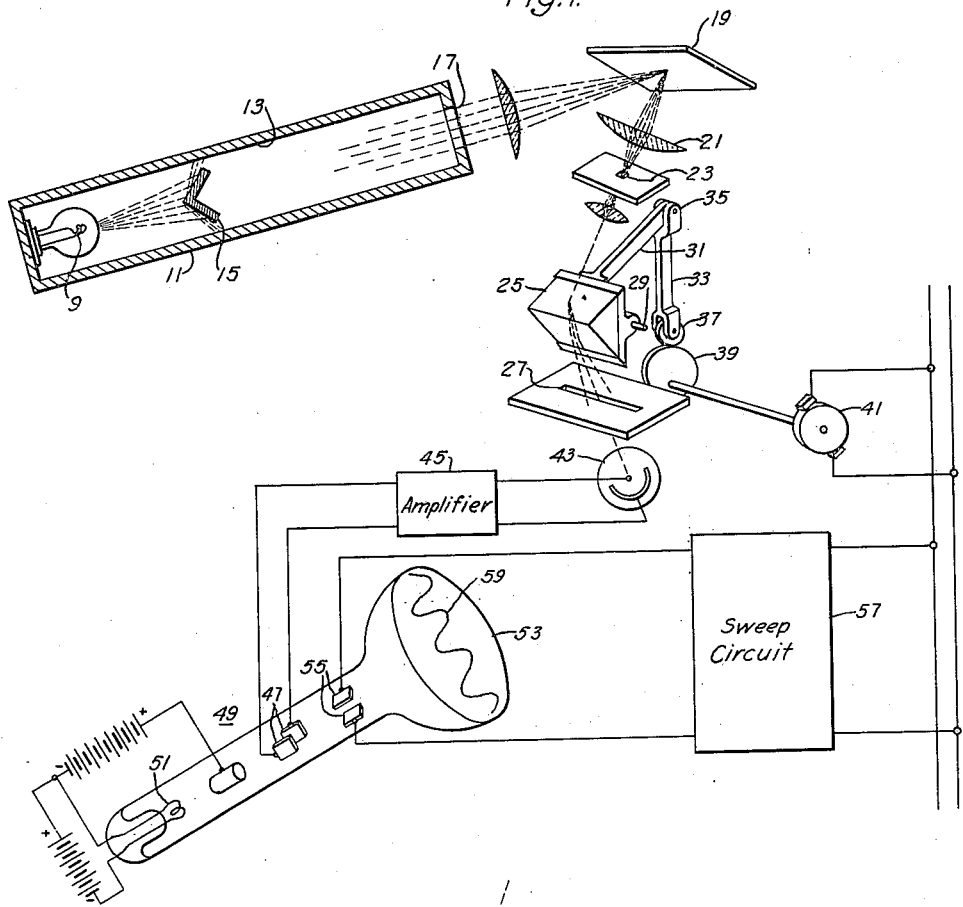
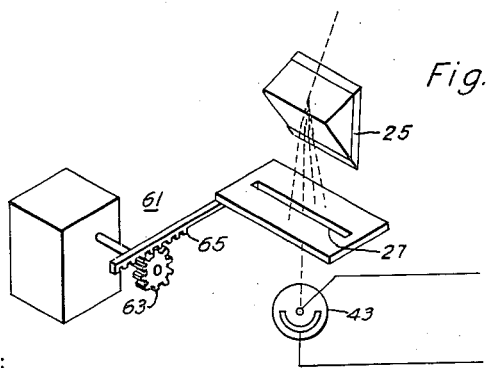
WITNESSES:
INVENTOR
Dayton Ulrey
BY
ATTORNEY March 12, 1940.  D. ULREY  2,193,606
PHOTOSENSITIVE APPARATUS
Filed Aug. 21, 1937  3 Sheets-Sheet 3
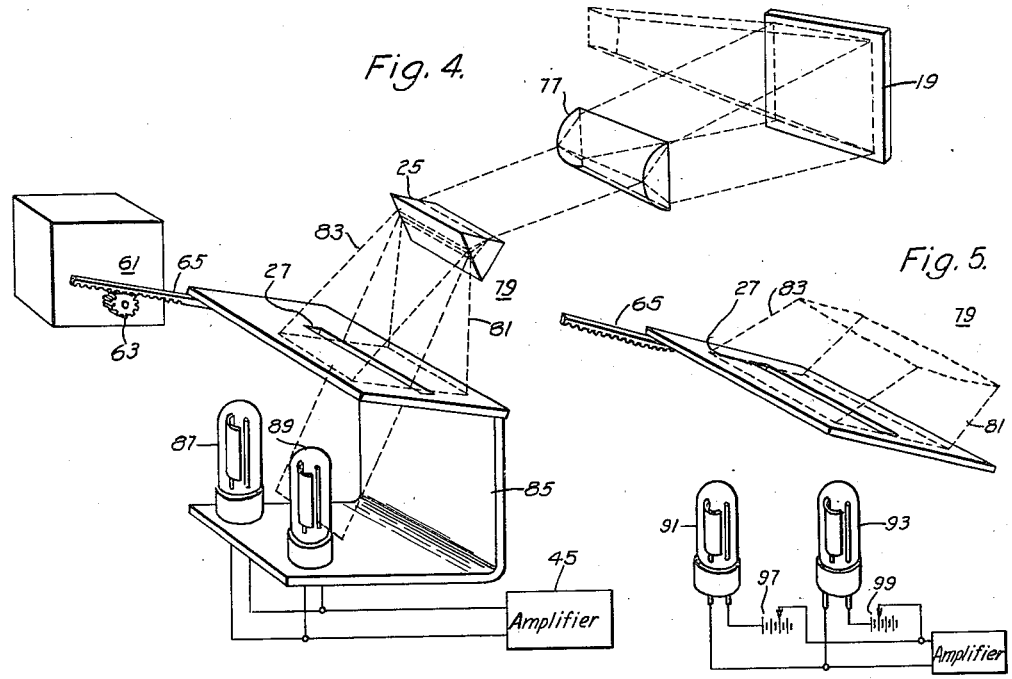
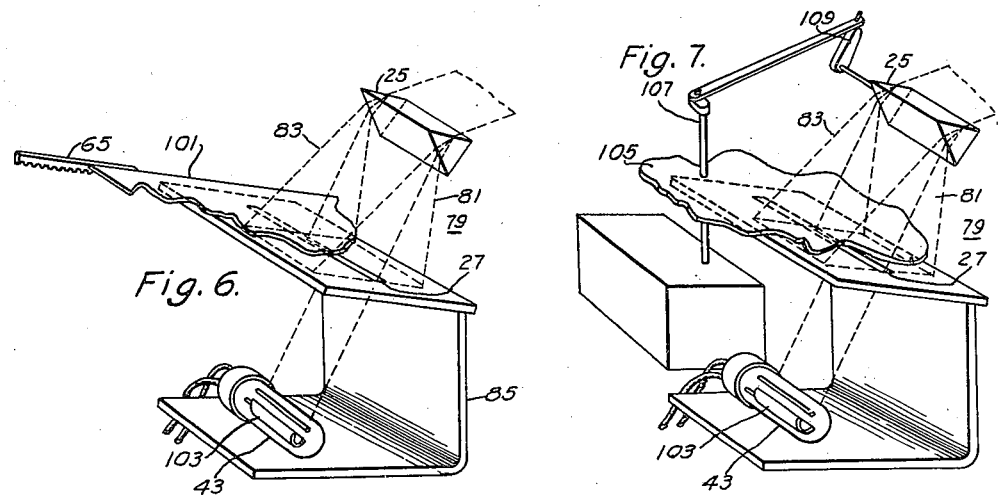
INVENTOR
Dayton Ulrey Patented Mar. 12, 1940

2,193,606

UNITED STATES PATENT OFFICE 2,193,606

PHOTOSENSITIVE APPARATUS

Dayton Ulrey, Wilkinsburg, Pa., assignor to Westinghouse Electric & Manufacturing Company, East Pittsburgh, Pa., a corporation of Pennsylvania Application August 21, 1937, Serial No. 160,266

8 Claims. (Cl. 88—14)

My invention relates to photosensitive apparatus and has particular relation to apparatus for analyzing the light emitted by an article as it appears to the human eye into its component colors.

Color analyzing apparatus according to the teachings of the prior art of which I am aware is in general comparatively cumbersome and expensive. In one system, the record of the color composition of the article under observation is impressed on a photographic film mounted on a recording drum and the film is developed to obtain the information desired. In another system, a series of observations are laboriously taken and as laboriously plotted.

It is accordingly an object of my invention to provide simple and inexpensive color analyzing apparatus.

Another object of my invention is to provide color analyzing apparatus that shall be operable with facility and that shall yield the necessary information without delay or excessive expense.

An incidental object of my invention is to provide, for a color analyzing system, a contrivance for so equalizing the important characteristics of the elements used in the system that the data obtained by the system shall be a precise analysis of the colors of the object under observation as it appears to the eye.

More specifically stated, it is an object of my invention to provide accurate color analyzing apparatus by the operation of which the analysis shall be obtained with facility and displayed in such manner that the necessary observations are easily made.

According to my invention, I provide a system incorporating an optical element for dispersing the radiation emitted by the object under observation. The color components of the radiation so dispersed influence the electron stream of a cathode ray tube or a similar device and deflect the electron stream in correspondence with the magnitude of the components. The electron stream is also deflected in a direction at an angle, preferably at right angles, to the direction of deflection in response to the color components of the radiant energy, and the net result is a two dimensional display, similar to a graph in which the intensity of each color component is plotted as a function of the wave length. If a permanent record is desired, the curve obtained on the cathode ray screen may be photographed with facility.

The emissivity of the source of radiant energy whereby the article under observation is illuminated is, in general, not uniform over the whole range of wave lengths under observation. Moreover, the response of the element whereby the individual dispersed color components are converted into an energy modification such that they influence the electron beam of the cathode ray tube is not constant for all of the wave lengths under observation. To obtain the desired analysis, the product of the emissivity of the light source by the response of the light sensitive device at each wave length should be constant for all wave lengths.

In accordance with a further aspect of my invention, I provide equalizing apparatus which yields substantially this result. The product of the emissivity by the response is maintained substantially constant over a wide range of wave lengths in accordance with one aspect of my invention by utilizing a pair of photo-electric cells to convert the color components of the radiant energy into electrical energy. The cells are so selected that one compensates for the other and together they compensate, at least partially, for the variations in the emissivity of the source. In lieu of utilizing such combinations of photo-electric cells, screens or shutters of various types may be utilized to cut off predetermined portions of the radiant energy impinging on the responsive element at each wave length.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

Figure 1 is a view partly diagrammatic and partly in perspective showing a preferred embodiment of my invention;

Fig. 2 is a view partly diagrammatic and partly in perspective showing a modification of my invention;

Fig. 4 is a view in perspective showing another modification of my invention;

Fig. 5 is a view in perspective showing a further modification of my invention;

Fig. 6 is a view in perspective showing still another modification of my invention; and Fig. 7 is a view in perspective showing a still further modification of my invention.

Figure 3:
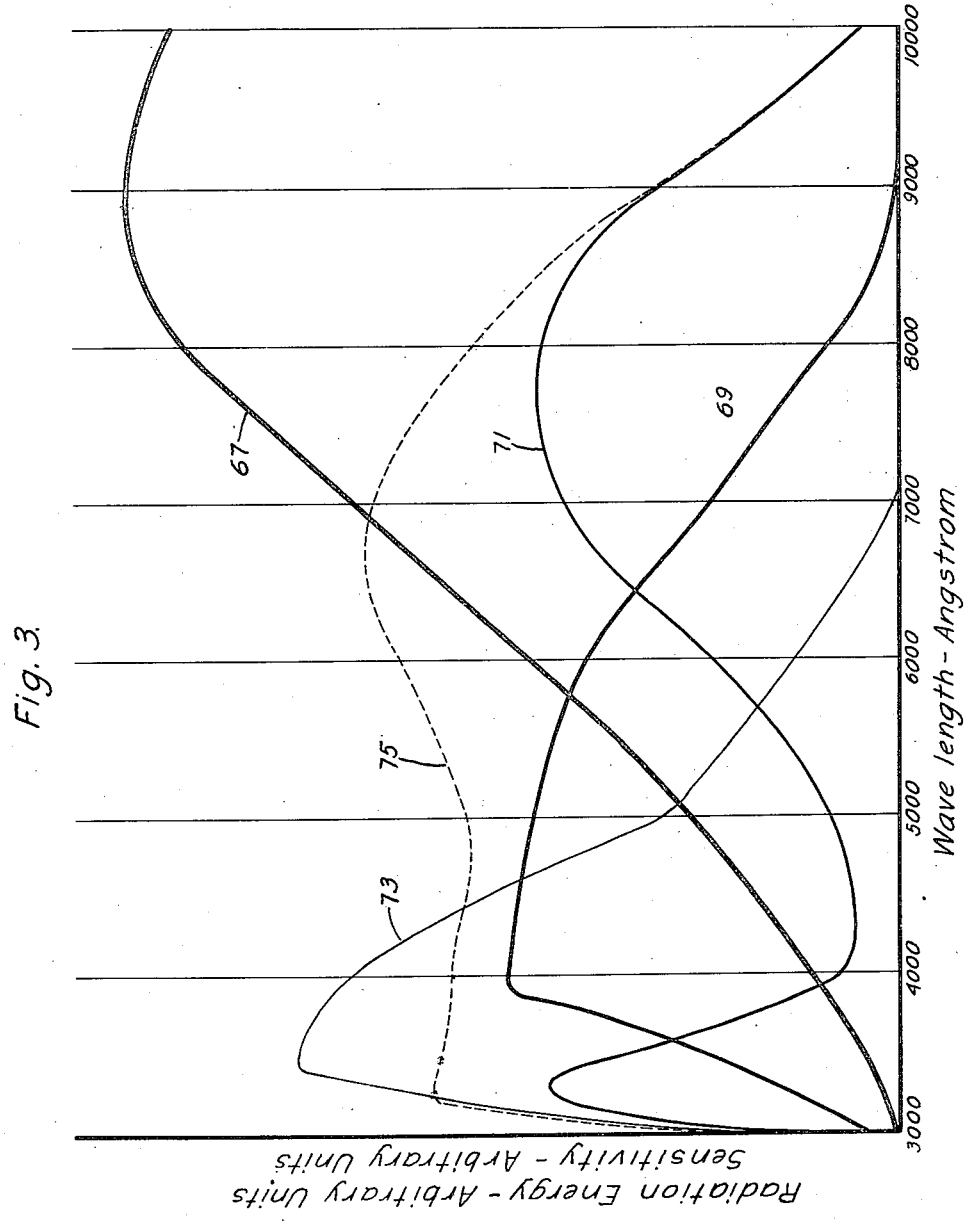
Fig. 3 is a graph showing the emissivity-wave-length characteristics of an actual source and the response-wave-length characteristics of a number of actual photo-electric cells.

The apparatus shown in Fig. 1 comprises a source 9 of radiant energy as, for example, a tungsten lamp which is disposed with a diffusing cylinder 11. The internal surface 13 of the cylinder 11 is coated with magnesium carbonate or any other suitable diffusing material. The radiant energy from the lamp is projected on a suitable reflector 15 and the reflected radiation impinges on the wall of the cylinder 11 and is reflected back and forth and diffused until it passes through a slot 17 in the end of the cylinder as diffused white light. The radiation projected through the slot 17 is collimated and impinges on the article 19, under observation, illuminating its surface. It is to be noted that while I have shown herein a system in which the radiant energy reflected by an article is analyzed, apparatus in which the radiant energy transmitted by an article is analyzed lies within the scope of my invention.

The radiation emitted by the article 19 is collected by a suitable lens 21 and projected onto a small slot 23 which is thus illuminated and functions as a secondary source. The radiation is emitted by the slot 23 as a narrow pencil and impinges on the surface of a refracting prism 25. The prism 25 is composed of a material particularly adapted to disperse the radiation without absorbing to any substantial extent the portion in the range of wave lengths concerning which information is sought. For example, if visible light is to be observed, the prism 25 may be an ordinary glass prism. However, it is contemplated that my invention may also be utilized to analyze the ultra-violet or infra-red radiations emitted by a body into its wave length components. Where observations of this type are desired, the prism must be of a material selected to transmit the radiant energy under observation. For example, if ordinary infra-red or ultra-violet radiation is to be observed, the prism 25 may be composed of quartz or rock salt.

The radiant energy projected on the prism 25 is dispersed into its color components and impinges on a further slot 27. The slot 27 is oriented at right angles to the direction of dispersion of the radiation and is constructed of such width as to pass only a small portion of the color spectrum produced by the prism. The selection of the width of the slot is of course governed by the character of the color analysis desired. If the analysis is to be coarse the slot may be wide, if it is to be fine, the slot must be narrow and its width may be of the order of ½ to 5 thousandths of an inch.

The prism 25 is pivotally mounted on a pin 29 and is oscillated by the cooperation of a pair of levers 31 and 33 about the pin. One of the levers 31 is secured to the prism and the other 33 is hinged to the one secured to the prism at one end 35 and provided with a roller 37 which engages a cam 39 at the other end. The cam is rotated by a suitable motor 41 and moves the lever 33 up and down. The latter pivots the lever 31 and it correspondingly oscillates the prism 25. As the prism oscillates, the dispersed radiation emitted thereby passes over the slot 27 and the color components of the radiation are successively transmitted through the slot.

A photosensitive device 43 is disposed directly behind the slot in such a position that the radiation transmitted through the slot impinges thereon. Accordingly, the conductivity of the photosensitive device is varied in accordance with the intensity of the radiant energy transmitted through the slot and, therefore, in succession, in accordance with the intensity of the color components of the radiation emitted by the article under observation. The output of the photoelectric cell 43 is suitably magnified by an amplifier 45 and the output of the amplifier is impressed on one set of deflecting plates 47 of a suitable cathode ray tube 49. While the deflecting effect in response to the color components is specifically shown herein as applied electrostatically, it will, of course, be understood that magnetic deflection may also be utilized. The electron stream emitted by the cathode 51 of the tube 49 is thus deflected in one direction by the plates 47 in accordance with the intensity of the color components under observation and when it impinges on the luminous screen 53 of the tube produces a set of correspondingly displaced luminous points. It is to be noted that the visibility of the luminous points is in no way affected by the visibility or invisibilty of the radiation being analyzed.

To provide a two dimensional display showing the color analysis, a second set of deflecting plates 55 disposed in the usual manner at right angles to the first pair is utilized. The potential supplied to the latter plates may be provided by one of the many sweep circuits 57 available in the art. The periodicity of the sweep potential impressed on the second pair of deflecting plates 55 should be so selected as to correspond to the periodicity of the oscillations of the prism 25. Preferably the cathode ray beam should be moved completely across the observation screen by the sweep circuit during the same time that the prism 25 completes an oscillation in one direction and carries the dispersed radiation from one end of the spectrum under observation to the other. In general, the number of oscillations of the prism 25 per unit time may be any integral multiple of the number of sweeps of the electron stream per unit time. However, regardless of the relationship selected, synchronism between the two movements should be maintained and the period of the lower frequency should be less than the interval of persistance of vision, i. e., less than 1/16 second.

With the prism oscillating and the plates 47 and 55 suitably energized by the color component impulses and the properly timed impulses from the sweep circuit, a display is produced on the screen 53 which is similar to the curve 59 shown in Fig. 1. The height of the curve at any point represents the intensity of the color component corresponding to the point.

It is to be noted that under certain circumstances the sweep circuit 57 need not at all be utilized and the cathode ray beam may be deflected by impressing alternating or periodic potential from the source whereby the motor 41 is energized directly across the plates 55. In such a case the motor should be of the synchronous type and its speed should be such that the prism 25 completes an oscillation in one direction during each quarter cycle of the source.

In lieu of oscillating the prism 25, the slot 27 through which the dispersed radiation is transmitted may be moved back and forth. An arrangement of this type is illustrated in Fig. 2. In this modification, the prism 25 is fixed and the slot is oscillated by a suitable rack and pinion device 61. The pinion 63 oscillates, moving the rack 85 back and forth and thus correspondingly moving the slot in the path of the dispersed beam.

As shown and described hereinabove, the apparatus does not incorporate any means for compensating for the variations with changing wave length of the intensity of the source 9 and the response of the photosensitive device 43. The character of the variation involved is illustrated in Fig. 3. In this view, the emissivity of a source and the response of a plurality of photosensitive devices are plotted in arbitrary units as ordinate and the wave length is plotted as abscissa. The very heavy full-line curve 67 of Fig. 3 is a plot of the emissivity of an ordinary tungsten lamp at 2800° Kelvin as a function of wave length. It will be noted that the emissivity varies from a relatively low value at 3000 Angstroms to a very high value at 8000 or 9000 Angstroms. The heavy curve 69 which is somewhat lighter than the emissivity curve is a plot of the response of Westinghouse SK–51 or SR–51 photo-tubes as a function of wave length; the medium curve 71 is a plot of the response of Westinghouse SK–60 or SR–60 photo-tubes as a function of wave length; and the light curve 73 is a plot of the response of the Westinghouse SR–17 photo-tube as a function of wave length. The broken-line curve 75 is a plot of the sum of the heavy curve and the medium curve and shows the result of superimposing the responses of two photosensitive devices corresponding to the two curves.

As has been explained hereinabove to obtain a desirable color analysis, the product of the emissivity of the source by the response of the photosensitive device at each wave length should be maintained the same for all wave lengths. A simple but relatively crude way of obtaining the desired relationship is to combine two photo-tubes having the desired complementary characteristics. Thus, the emissivity of the source may be relatively uniform as a function of wave length over the range which it is desired to observe. In such a case, the photosensitive devices should be so selected that their combined response is substantially uniform as a function of wave length over the same range. For example, where the range under observation extends between a wave length of the order of 3500 Angstroms and a wave length of the order of 7000 Angstroms, an arrangement corresponding to the broken-line curve in Fig. 3 may be utilized. In this case, therefore, two photosensitive devices one an SK–51 or an SR–51 and the other an SK–60 or an SR–60 should be used.

An arrangement of this character is shown in Fig. 4. The radiation from the article 19 under observation is collected by a cylindrical lens 77 and thus converted into an elongated beam. The beam thus produced is projected on the prism 25 and dispersed. The radiation emitted by the prism covers a prismatic region 79 in space, one lateral boundary 81 of which is an elongated beam of the lowest wave length and the other lateral boundary 83 of which is an elongated beam of the highest wave length under observation. In the path of the light prism 79 so produced, the elongated slot 27 is mounted, and secured to the slot is a bracket 85 on which the photosensitive devices 87 and 89 of the characteristics mentioned hereinabove, are mounted in such manner that they are influenced by the radiation transmitted through the slot. The slot 27 and the bracket 85 together with the photo-sensitive devices 87 and 89 are oscillated by the rack and pinion arrangement of the type utilized in the Fig. 2 system, and as the slot moves in the path of the light prism 79 it successively transmits color components of the radiation to the photosensitive devices.

The latter are connected in parallel to the amplifier 45, and the output of the amplifier is coupled to the deflecting plates 47 of the cathode ray tube as in the Fig. 1 arrangement. The source whereby the article under observation is illuminated is not shown in the drawing, but as has been explained it should have a substantially uniform emissivity-wave-length characteristic over the range under observation if the combined output of the photosensitive devices 87 and 89 corresponds to the broken-line curve shown in Fig. 3. Of course, the display which is now produced on the screen 53 of the cathode ray tube 49 is in appearance similar to the curve 59. The actual magnitudes of the deflections, however, now correspond more precisely to what the human eye would observe in daylight.

My invention should, of course, be in no way restricted to two photosensitive devices, the responses of which add up to a substantially horizontal curve such as 75. The photosensitive devices 87 and 89 may be so selected that the total response curve assumes any desired form and compensates for variations in the emissivity curve of whatever source may be used. Moreover, the relative effect of one or the other of the photosensitive devices 87 or 89 may be varied at will by varying the potential impressed between its electrodes so that the desired proportioning of the influence of the two characteristics is attained. Of course, the use of more than two photo-cells also lies within the scope of my invention.

In the apparatus shown in Fig. 4, the photosensitive devices are simultaneously energized by the radiant energy transmitted through the slot. The desired result may also be attained by energizing a pair of photosensitive devices in succession. That is to say, one of the photosensitive devices may be energized by the radiant energy covering a certain range of wave lengths and the other by the radiant energy covering another range of wave lengths. For example, if the source utilized has the emissivity corresponding to the very heavy curve 67 of Fig. 3, the necessary compensation may be attained by utilizing a photosensitive device corresponding to the light curve 73 of Fig. 3, i. e., an SR–17, up to approximately 5000 Angstroms and by utilizing a photosensitive device corresponding to the heavy curve 69, i. e., an SK–51 or an SR–51, from 5000 Angstroms to 9000 Angstroms.

The distinguishing features of the corresponding arrangement are shown in Fig. 5. Here again a prism 79 of dispersed radiant energy is transmitted through the slot 27. A pair of photosensitive devices 91 and 93 are disposed behind the slot and displaced in such manner that one of them is influenced by one range of wave lengths and the other by the remaining range of wave lengths under observation as the slot is moved by a rack and pinion arrangement. If the SR–17, SK–51 or SR–51 combination is utilized, the displacement is such that the SR–17 photo-tube 93 will be influenced by the lower range of wave lengths from aproximately 3500 Angstroms to 5000 Angstroms, while the SR–51 or the SK–51 tube 91 will be influenced by the higher range of wave lengths from 5000 to 9000 Angstroms. There will, in the ordinary practice of my invention, also be a certain overlapping region in which both photosensitive devices are simultaneously influenced by the radiant energy. The photosensitive devices 91 and 93 are connected in parallel to the amplifier unit 45, preferably through sources of potential 97 and 99 varying their relative effect.

In Fig. 6 still another equalizing arrangement is illustrated. In this system, the prism 25 is fixed and again disperses an elongated beam of radiant energy into a prism 79 of radiant energy. The slot 27 is oscillated by a rack and pinion device as in the other apparatus. To produce the equalizing effect, a screen 101 is interposed in the beam of radiant energy. The screen has a contour such as to compensate for the variations in the emissivity of the source and the response of the photosensitive device. The contour of the screen is determined by measuring the spectral distributions of the emissivity of the source and the response of the photosensitive device 43 and giving the portions of the screen that are to be disposed in the path of the different wave length components, heights such that the amount of radiation screened out compensates for the greater or less emissivity and response at each particular wave length. The screen may, of course, be disposed either in front of the slot 27 as shown in Fig. 6 or between the slot and the photosensitive device 43. The photosensitive device 43 has an elongated cathode 103 and is so disposed that the beam of radiant energy transmitted through the slot when it is totally unscreened impinges on the cathode and extends longitudinally across its surface.

In lieu of the screen shown in Fig. 6, a shutter 105, the contour of which is dimensioned in the same manner as the screen, may be utilized. An arrangement incorporating the shutter is shown in Fig. 7. In this case, the slot 27 and the photosensitive devices 43 are fixed and the prism 25 is oscillated. The oscillation of the prism, however, corresponds to the rotation of the shutter and is synchronized therewith. To accomplish this in a simple manner, the shutter is mounted to be rotated with a motor-driven shaft 107 and a crank 109, by the operation of which, the prism 25 is oscillated, is driven from the same shaft.

My use of the word "emit," with reference to the article 19, herein, is meant to encompass any general transfer of radiation between the source 9 and the other elements of the apparatus through the article. The article 19 operating as a secondary source may reflect or transmit radiation or it may operate as a primary source originating the radiation. All of these modes of obtaining the radiation are included within the scope of the word "emit."

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. Apparatus for determining the spectral distribution of the radiation emitted by a body comprising means for projecting in a predetermined succession radiation corresponding to the color components of the spectrum of the radiation emitted by said body, a screen capable of producing a luminous spot at a point where a stream of electrons impinges thereon, means for projecting a stream of electrons onto said screen, radiant energy responsive means in a position to receive the radiation projected by said projecting means and adapted to subject said stream of electrons successively to electrical influences which vary in correspondence with the individual components of said spectrum thereby to deflect said stream in one direction along said screen in correspondence with the quantity of radiant energy of said components, and means for effecting a deflection of said stream in another direction for a predetermined distance for each deflection of said stream in said one direction.

2. Apparatus for determining the character of the radiation emitted by a body comprising means for projecting in a predetermined succession radiation corresponding to the color components of the spectrum of the radiation emitted by said body, a screen capable of producing a luminous spot at a point where a stream of electrons impinges thereon, means for projecting a stream of electrons onto said screen, radiant energy responsive means in a position to receive the radiation projected by said projecting means and adapted to subject said stream in a predetermined periodic sequence to an electrical influence which varies in correspondence with the individual components of said spectrum thereby to deflect said stream periodically in one direction in correspondence with the quantity of radiant energy of said components, and means for effecting a periodic deflection of said stream at an angle to said one direction and at a frequency which is an integral fraction of the frequency of the deflection in said one direction.

3. Apparatus for determining the character of the radiation emitted by a body comprising means for projecting in a predetermined succession radiation corresponding to the color components of the spectrum of the radiation emitted by said body, a screen capable of producing a luminous spot at a point where a stream of electrons impinges thereon, means for projecting a stream of electrons onto said screen, radiant energy responsive means in a position to receive the radiation projected by said projecting means and adapted to subject said stream in a predetermined periodic sequence to an electrical influence which varies in correspondence with the individual components of said spectrum thereby to deflect said stream periodically in one direction in correspondence with the quantity of radiant energy of said components, and means for effecting a periodic deflection of said stream at an angle to said one direction and at a frequency which is an integral fraction of the frequency of the deflection in said one direction, the smaller of said two deflecting frequencies having a period at least equal to the period of persistence of vision.

4. Apparatus for determining the character of the radiation emitted by a body comprising a source of radiant energy, means for projecting in a predetermined succession radiation corresponding to the color components of the spectrum of the resultant radiation emitted by said body when subjected to the radiation from said source, a screen capable of producing a luminous spot at a point where a stream of electrons impinges thereon, means for projecting a stream of electrons on said screen, means for subjecting said stream to electrical influences which vary in correspondence with the individual components of said spectrum thereby to deflect said stream in one direction along said screen in correspondence with the quantity of radiation of said components, said subjecting means including a radiant energy responsive mechanism in a position to receive the radiation projected by said projecting means, and means for so equalizing the functional relationship between emissivity and wave length of the color components for said source and the functional relationship between response and wave length for said radiant energy responsive mechanism that the product of the emissivity by the response at all wave lengths within the range under consideration is substantially the same, and means for effecting a deflection of said stream in another direction for a predetermined distance for each deflection of said stream in said one direction.

5. Apparatus according to claim 1 characterized by the fact that the projecting means includes a refracting prism and the radiant energy responsive means includes a slot and means for moving said prism in such manner that as it assumes different positions different components of the radiation are transmitted through said slot.

6. Apparatus according to claim 1 characterized by the fact that the projecting means includes a refracting optical element and the radiant energy responsive means includes a slot and means for moving said slot in the path of the radiations dispersed by said optical element in such manner that as it assumes different positions it transmits different components.

7. Apparatus for determining the character of the radiation emitted by a body comprising a source of radiant energy, means for projecting in a predetermined succession radiation corresponding to the color components of the spectrum of the resultant radiation emitted by said body when subjected to the radiation from said source, a screen capable of producing a luminous spot at a point where a stream of electrons impinges thereon, means for projecting a stream of electrons on said screen, means for subjecting said stream to electrical influences which vary in correspondence with the individual components of said spectrum thereby to deflect said stream in one direction along said screen in correspondence with the quantity of radiation of said components, said subjecting means including a plurality of radiant energy responsive cells connected in a circuit and in a position to receive the radiation projected by said projecting means, each of said cells having a different wavelength-response characteristic and said characteristics being so selected with reference to the emissivity-wave-length characteristic of said source that the product of the emissivity by the combined response is substantially the same at all wave lengths within the range under consideration, and means for effecting a deflection of said stream in another direction for a predetermined distance for each deflection of said stream in said one direction.

8. Apparatus according to claim 4 characterized by the fact that the subjecting means includes an elongated slot which is so positioned as to select elongated beams of radiant energy corresponding to components of the spectrum of the resultant radiation and the equalizing means includes a screen so positioned as to cut off a portion of said beams before they impinge on the radiant energy responsive mechanism, the portion of the beam which is cut off at each wave length being such that the product of the net radiation impinging on the radiant energy responsive mechanism and the response of said radiant energy responsive mechanism is substantially the same for all wave lengths within the range under consideration.

DAYTON ULREY.